United States Patent
Feral-Martin et al.

(10) Patent No.: US 11,555,121 B2
(45) Date of Patent: Jan. 17, 2023

(54) PRECIPITATED SILICA AND PROCESS FOR ITS MANUFACTURE

(71) Applicant: RHODIA OPERATIONS, Aubervilliers (FR)

(72) Inventors: Cédric Feral-Martin, Emerainville (FR); Laure Bertry, Aubervilliers (FR); Emmanuelle Allain Najman, L'Hay les Roses (FR)

(73) Assignee: RHODIA OPERATIONS, Aubervilliers (FR)

( * ) Notice: Subject to any disclaimer, the term of this patent is extended or adjusted under 35 U.S.C. 154(b) by 21 days.

(21) Appl. No.: 17/043,741

(22) PCT Filed: Apr. 11, 2019

(86) PCT No.: PCT/EP2019/059180
§ 371 (c)(1),
(2) Date: Sep. 30, 2020

(87) PCT Pub. No.: WO2019/197508
PCT Pub. Date: Oct. 17, 2019

(65) Prior Publication Data
US 2021/0024755 A1 Jan. 28, 2021

(30) Foreign Application Priority Data
Apr. 12, 2018 (EP) .................................. 18305448

(51) Int. Cl.
| | | |
|---|---|---|
| *C09C 1/30* | (2006.01) | |
| *C01B 33/193* | (2006.01) | |
| *C04B 14/06* | (2006.01) | |
| *C04B 20/02* | (2006.01) | |
| *C08K 3/36* | (2006.01) | |
| *C08K 9/04* | (2006.01) | |
| *D21H 17/68* | (2006.01) | |
| *D21H 27/00* | (2006.01) | |

(52) U.S. Cl.
CPC .......... *C09C 1/3063* (2013.01); *C01B 33/193* (2013.01); *C04B 14/06* (2013.01); *C04B 20/023* (2013.01); *C08K 3/36* (2013.01); *C08K 9/04* (2013.01); *D21H 17/68* (2013.01); *D21H 27/00* (2013.01); *C01P 2006/11* (2013.01); *C01P 2006/12* (2013.01); *C01P 2006/14* (2013.01); *C01P 2006/32* (2013.01); *C01P 2006/80* (2013.01); *C04B 2201/30* (2013.01); *C08K 2201/006* (2013.01)

(58) Field of Classification Search
CPC ................ C01B 33/193; C01P 2006/11; C01P 2006/12; C01P 2006/14; C01P 2006/16; C01P 2006/32; C01P 2006/80; C04B 14/06; C04B 20/023; C04B 2201/30; C08K 2201/006; C08K 3/36; C08K 9/04; D21H 17/68; D21H 27/00; C09C 1/3063
See application file for complete search history.

(56) References Cited

U.S. PATENT DOCUMENTS

| | | | |
|---|---|---|---|
| 2,441,422 A | 5/1948 | Krieble | |
| 2009/0214449 A1* | 8/2009 | Valero | C01B 33/193 106/491 |
| 2017/0015562 A1* | 1/2017 | Boivin | C08K 3/36 |
| 2020/0308412 A1* | 10/2020 | Schneider | C01B 33/193 |

FOREIGN PATENT DOCUMENTS

| | | |
|---|---|---|
| EP | 0917519 B1 | 7/2003 |
| EP | 1559744 A1 | 8/2005 |
| FR | 72231 E | 8/1960 |
| WO | 2017109740 A1 | 6/2017 |
| WO | 2018019373 A1 | 2/2018 |

* cited by examiner

*Primary Examiner* — Shuangyi Abu Ali
(74) *Attorney, Agent, or Firm* — Osha Bergman Watanabe & Burton LLP

(57) ABSTRACT

A precipitated silica suitable for thermal insulation applications and a process for its manufacture.

18 Claims, No Drawings

PRECIPITATED SILICA AND PROCESS FOR ITS MANUFACTURE

This application is a U.S. national stage entry under 35 U.S.C. § 371 of International Application No. PCT/EP2019/059180 filed Apr. 19, 2019, which claims priority to European application EP18305448.5 filed on Dec. 4, 2018, the whole content of this application being incorporated herein by reference for all purposes.

TECHNICAL FIELD

The present invention relates to precipitated silica and to a process for its manufacture.

BACKGROUND ART

The use of alkali metal alkyl siliconates for the surface modification of precipitated silica has been disclosed. WO 2018/019373 discloses a process which comprises an acid, a compound selected from a precipitated silica and/or [SiO$_{4/2}$] precursor material and an organosiliconate, wherein the modification reaction takes place during or directly after the reaction to produce the precipitated silica. The precipitated silica obtained from the process finds use as reinforcing filler in silicone elastomer composition, in toners or developers.

It has now been surprisingly found that the pore structure of precipitated silica obtained in the presence of alkali metal alkyl siliconates can be modified by using an organic acid, in particular a carboxylic acid, as the acid in the precipitation reaction. The resulting pore structure makes the precipitated silica particularly suitable for thermal insulation applications.

SUMMARY OF INVENTION

A first objective of the present invention is to provide a novel precipitated silica which has a pore structure which makes it suitable for thermal insulation applications. A second objective of the invention is to provide a process for the manufacture of a the precipitated silica.

The inventive precipitated silica is characterised, among alia, by a large volume of the pores having a diameter of 100 nm or less, as measured by mercury porosimetry. The inventive silica is defined in detail in the description which follows and in the claims and the examples.

DESCRIPTION OF INVENTION

A first object of the present invention is a precipitated silica characterised by:
  a CTAB surface area of at least 160 m$^2$/g;
  a volume of the pores having a diameter of 100 nm or less of at least 1.15 mL/g; and
  a carbon content of from 0.5 wt % to 15.0 wt %.

In the present specification, the terms "silica" and "precipitated silica" are used as synonyms. The expression "precipitated silica" defines an amorphous silica which is produced by the acidification of solutions of sodium silicate, followed by filtration of the precipitate and drying in the absence of any step wherein water is extracted from the precipitate using an organic solvent, e.g. an alcohol, or a supercritical fluid.

The precipitated silica according to the invention has a CTAB surface area of at least 160 m$^2$/g, preferably of at least 170 m$^2$/g. The CTAB surface area may even be at least 180 m$^2$/g. The CTAB surface area is at most 600 m$^2$/g, in particular at most 450 m$^2$/g, even at most 400 m$^2$/g, and still at most 380 m$^2$/g. Typically, the CTAB surface area is between 160 and 450 m$^2$/g, for example between 170 and 400 m$^2$/g.

The volume generated by the pores of the inventive silica is measured by mercury porosimetry as described in detail hereafter. The volume of the pores having a diameter of 100 nm or less, hereinafter referred to as "V$_{100}$", is at least 1.15 mL/g, even at least 1.17 mL/g. The V$_{100}$ is at most 2.50 mL/g, preferably at most 2.00 mL/g, and even at most 1.90 mL/g.

The precipitated silica of the invention has a carbon content of at least 0.5 wt %, typically from 0.5 wt % to 15.0 wt %. Throughout the present text the carbon content is defined as the amount of carbon by weight with respect to the total weight of silica. The carbon content is typically less than 10.0 wt %, and it may be even less than 7.0 wt %. Advantageously, the carbon content is from 0.5 wt % to 7.0 wt %, even from 0.7 to 5.0 wt %. In some instances the carbon content may be less than 2.2 wt %, even less than 2.0 wt %.

The expressions wt % and % by weight are used as synonyms.

In a first embodiment the inventive precipitated silica is characterized by:
  a CTAB surface area of at least 160 m$^2$/g and at most 600 m$^2$/g, preferably of at least 160 m$^2$/g and at most 450 m$^2$/g;
  a volume of the pores having a diameter of 100 nm or less of at least 1.15 mL/g and at most 2.50 mL/g; and
  a carbon content of from 1.4 wt % to 2.2 wt %, preferably from 1.5 wt % to 2.0 wt %.

In a second embodiment the inventive precipitated silica is characterized by:
  a CTAB surface area of at least 205 m$^2$/g and at most 600 m$^2$/g, preferably of at least 210 m$^2$/g and at most 450 m$^2$/g;
  a volume of the pores having a diameter of 100 nm or less of at least 1.15 mL/g and at most 2.50 mL/g; and
  a carbon content of from 0.5 wt % to 15.0 wt %, preferably from 0.5 wt % to 7.0 wt %.

The inventive silica comprises alkyl moieties chemically bound to at least a portion of the Si atoms in the silica structure. The resonance in the $^{13}$C NMR spectrum of the precipitated silica assigned to the methyl groups in said alkyl moieties is between −2.5 and −4.5 ppm.

The expression "alkyl moiety(ies)" is used herein in its conventional meaning to refer to alkyl radicals of general formula (C$_m$H$_{2m+1}$)—. The alkyl moiety(ies) are chemically bound to the Si atoms of the precipitated silica. The structure of the inventive silica can be described as comprising units of formula [SiO$_{4/2}$] and units of formula [(C$_m$H$_{2m+1}$)SiO$_{3/2}$].

The alkyl moieties derive from at least one alkali metal alkyl siliconate.

Suitable alkali metal alkyl siliconates are those of general formula (I):

HO—[Si(C$_m$H$_{2m+1}$)(OM)-O—]$_n$H    (I)

wherein n is an integer from 1 to 6, especially from 1 to 3, preferably n is 1; (C$_m$H$_{2m+1}$) is a linear or branched alkyl radical wherein m is an integer from 1 to 5, especially from 1 to 3, particularly preferably m is 1; and M is an alkali metal, preferably sodium or potassium.

The chemically bound alkyl moieties in the inventive silica are preferably selected from the group consisting of methyl, ethyl and propyl, linear or branched. In a preferred embodiment the chemically bound alkyl moieties are methyl. In such an embodiment, the alkali metal alkyl siliconate is selected from sodium or potassium methyl siliconate.

The $^{13}$C NMR spectrum of the precipitated silica of the invention is characterised by the fact that the resonances for the chemically bound methyl groups are between −2.5 and −4.5 ppm. The expression "resonance between −2.5 and −4.5 ppm" is used herein to indicate that the maximum of the resonance peak assigned to the methyl group(s) is present in the area of the $^{13}$C NMR spectrum between −2.5 and −4.5 ppm when the chemical shift scale is calibrated with the resonances of adamantane (at 38.5 ppm and 29.4 ppm).

It is observed that the resonance assigned to the methyl groups of the chemically bound alkyl moieties in the inventive silica is shifted with respect to the resonances of the same methyl groups of the alkali metal alkyl siliconate used in the preparation of the precipitated silica. For instance, when the alkali metal alkyl siliconate is potassium methyl siliconate, the methyl resonance is shifted from −1.1 ppm to the range from −2.5 to −4.5 ppm.

The precipitated silica according to the invention typically has a BET surface area of between 150 m$^2$/g and 650 m$^2$/g, in particular between 170 m$^2$/g and 500 m$^2$/g, even between 190 and 450 m$^2$/g, for example between 190 and 400 m$^2$/g. BET surface area may be determined according to the Brunauer-Emmett-Teller method as detailed in standard NF ISO 5794-1, Appendix E (June 2010).

It is believed that due to the balance between CTAB surface area and $V_{100}$, the inventive precipitated silica is characterized by a low thermal conductivity. It is thus particularly suited for use in thermal insulation applications. The thermal conductivity λ of the inventive silica is generally no more than 50 mW/m·K, preferably no more than 47 mW/m·K, when measured at atmospheric pressure, 1 bar, as detailed hereafter.

The thermal conductivity λ (in W/m·K) represents the amount of heat passing through the insulator when the temperature difference between the two faces is 1° K.

The lower the thermal conductivity the better the ability of the material to function as thermal insulator. Generally the thermal conductivity of the inventive silica is not less than 1 mW/m·K, not less than 1 mW/m·K, even not less than 10 mW/m·K.

The inventive silica is further characterised by a thermal conductivity λ measured under vacuum of at most 1 mW/m·K.

The precipitated silica according to the invention has a packing density, measured according to standard ISO 787/11, of at most 0.50 g/cm$^3$, preferably of 0.10 to 0.50 g/cm$^3$, in particular between 0.10 and 0.40 g/cm$^3$. In some instances the packing density may be between 0.10 and 0.35 g/cm$^3$, even between 0.10 and 0.30 g/cm$^3$.

The inventive precipitated silica may advantageously be obtained by a process which comprises the reaction of a silicate with a carboxylic acid to produce a suspension of precipitated silica, said reaction comprising at least one step wherein at least one alkali metal alkyl siliconate is provided to the reaction medium before 50% of the precipitation reaction has taken place.

The process does not comprise any step wherein water is extracted from the precipitate using an organic solvent, e.g. an alcohol, or a supercritical fluid.

A second object of the invention is thus a process for preparing the inventive precipitated silica.

The process comprises the reaction of a silicate with a carboxylic acid to produce a suspension of precipitated silica, said reaction comprising at least one step wherein at least one alkali metal alkyl siliconate is provided to the reaction medium before 50% of the precipitation reaction has taken place.

The term "silicate" is used herein to refer to one or more than one silicate which can be added during the course of the inventive process. The term "silicate" is used herein to refer to a compound selected from the group consisting of the alkali metal silicates. Advantageously, it is selected from the group consisting of sodium and potassium silicate. The silicate may be in any known form, such as metasilicate or disilicate.

In the case where sodium silicate is used, the latter generally has an $SiO_2/Na_2O$ weight ratio of between 2.0 and 4.0, in particular between 2.4 and 3.9, for example between 3.1 and 3.8.

The silicate is generally provided as a solution which typically has a concentration of between 3.9 wt % and 25.0 wt %, for example between 5.6 wt % and 23.0 wt %, in particular between 5.6 wt % and 20.7 wt %. Throughout the text silicate concentration in a solution is expressed in terms of the amount by weight of $SiO_2$.

The term "carboxylic acid" is used herein to refer to one or more than one carboxylic acid which can be added during the course of the inventive process. The expression "carboxylic acid" is used herein to refer to carboxylic acids comprising at least one carboxylic acid functional group. The expression "carboxylic acid functional group" is used herein in its customary meaning, to refer to the COOH functional group.

The carboxylic acid suitable for the process of the invention is selected from the linear or branched, saturated or unsaturated, aliphatic carboxylic acids having from 1 to 20 carbon atoms and from the aromatic carboxylic acids.

Among the aliphatic carboxylic acids mention may be made of the linear polycarboxylic acids, saturated or unsaturated, having from 1 to 14 carbon atoms, preferably having from 1 to 12 carbon atoms. Suitable polycarboxylic acids may have 1, 2, 3, 4, 5, 6, 7, 8, 9, 10, 11 or 12 carbon atoms. Suitable carboxylic acids may advantageously have 2, 3, 4, 5, 6, 7, 8, 9 or 10 carbon atoms, preferably 2, 3, 4, 5, 6, 7, or 8 carbon atoms. For instance the carboxylic acid may have 2, 3, 4, 5 or 6 carbon atoms.

Carboxylic acids suitable for the process of the invention may have one, two, three, four or even more than four carboxylic acid functional groups.

Notable, non-limiting examples of suitable mono-carboxylic acids are the acids selected from the group consisting of formic acid, acetic acid, propionic acid.

Notable, non-limiting examples of suitable linear aliphatic polycarboxylic acids are the acids selected from the group consisting of oxalic acid, malonic acid, succinic acid, glutaric acid and adipic acid.

Among branched polycarboxylic acids mention may be made of methyladipic acid, methylsuccinic acid, ethylsuccinic acid, oxalosuccinic acid, dimethylglutaric acid.

Among polycarboxylic acids comprising hydroxyl functional groups mention may be made of citric acid, lactic acid, malic acid, ascorbic acid and tartaric acid.

The acid may be metered into the reaction medium in diluted or concentrated form. The same acid at different concentrations may be used in different stages of the process.

In a preferred embodiment of the process carboxylic acid and sodium silicate are used in all the stages of the process.

The inventive process is characterized by the fact that the at least one carboxylic acid is used during the whole precipitation step.

The inventive process is characterized by the fact that the at least one alkali metal alkyl siliconate is added to the reaction medium before 50% of the precipitation reaction has taken place.

The total amount of the at least one alkali metal alkyl siliconate may be added to the reaction medium before 50% of the precipitation reaction has taken place.

The expression "before 50% of the precipitation reaction has taken place" is used herein to indicate any stage of the process in which the amount of $SiO_2$ that has been generated up to said given stage is less than 50 wt % of the final amount of $SiO_2$ produced in the process.

Depending on the process, the percentage of silica precipitation may be monitored in different manners. In one variant of the process, formation of 50 wt % of the total amount of silica corresponds to the addition to the reaction medium of 50% of the total amount of silicate to be added during the process.

In an alternative variant, formation of 50 wt % of the total amount of silica is achieved when the neutralization ratio for the reaction medium reaches 50%. The term "neutralization ratio" is defined as the ratio between the number of $H^+$ moles generated by the acid added to the reaction medium and the number of moles of alkali metal deriving from the silicate in the reaction medium.

Without wishing to be bound by theory, it is believed that the addition of at least one alkali metal alkyl siliconate before 50% of the precipitation reaction has taken place allows the incorporation of the alkyl moieties of the alkali metal alkyl siliconate in the structure of the precipitated silica.

Notable examples of suitable alkali metal alkyl siliconates are those of general formula (I) discussed above:

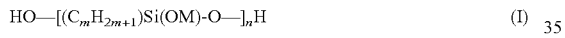

$$\text{HO}-[(C_mH_{2m+1})\text{Si}(\text{OM})-\text{O}-]_n\text{H} \quad (I)$$

wherein n is an integer from 1 to 6, especially from 1 to 3, preferably 1; $(C_mH_{2m+1})$— is linear or branched alkyl radical wherein m is an integer from 1 to 5, especially from 1 to 3, particularly preferably m is 1; and M is an alkali metal, preferably sodium or potassium.

In formula (I) preferably n=1 and the alkyl radical is selected from the group consisting of methyl, ethyl and propyl, linear or branched. In a preferred embodiment n=1 and m=1. In such an embodiment, the alkali metal alkyl siliconate is selected from sodium or potassium methyl siliconate.

The definitions and preferences provided above also apply to the specific embodiments of the process which are described hereafter.

In a first embodiment, the process comprises the steps of:
(i) providing a starting solution comprising at least a portion of the total amount of the alkali metal alkyl siliconate, at least a portion of the total amount of the silicate involved in the reaction and optionally an electrolyte, the concentration of silicate (expressed in terms of $SiO_2$) present in the starting solution being less than 100 g/L;
(ii) adding an amount of a carboxylic acid to said starting solution to obtain a pH value for the reaction medium of at least 7.0, in particular of between 7.0 and 8.5; and
(iii) further adding carboxylic acid, if appropriate, simultaneously the remaining amount of silicate to the reaction medium to obtain a silica suspension.

In this first embodiment of the process, at least a part of the total amount of the at least one alkali metal alkyl siliconate is present in the starting solution. The remaining part of the at least one alkali metal alkyl siliconate may be added to the reaction medium during the silica precipitation reaction, notably during step (ii) or (iii), with the proviso that all of the alkali metal alkyl siliconate is added before 50% of the precipitation reaction takes place.

Alternatively, the total amount of the at least one alkali metal alkyl siliconate may be provided in the starting solution.

In the first embodiment of the process, the point at which 50% of the precipitation reaction takes place corresponds to the neutralization ratio as above defined.

The starting solution of step (i) may comprise one or more electrolyte.

Preferably, the starting solution contains an electrolyte and, advantageously, the concentration of said electrolyte is less than 19 g/L. The term "electrolyte" is used herein in its generally accepted meaning, i.e. to identify any ionic or molecular substance which, when in solution, decomposes or dissociates to form ions or charged particles. In a second embodiment the process comprises the following steps:
(i) providing a starting solution comprising part of the total amount of silicate engaged in the reaction, the concentration of silicate (expressed in terms of $SiO_2$) in said starting solution being less than 20 g/L, preferably not more than 15 g/L;
(ii) adding carboxylic acid to said starting solution, until at least 50% of the amount of silicate present in said starting solution is neutralized;
(iii) simultaneously adding silicate and carboxylic acid to the reaction medium, such that the ratio (amount of silicate added)/(amount of silicate present in the starting solution) is greater than 4 and not more than 100, preferably between 12 and 100, in particular between 12 and 50; and
(iv) stopping the addition of the silicate while continuing the addition of the carboxylic acid to the reaction medium, until a value of the pH of the reaction medium of between 2.5 and 5.3, preferably between 2.8 and 5.2, is reached and a suspension of precipitated silica is obtained.

In this embodiment the at least one alkali metal alkyl siliconate is metered into the reaction medium in at least one of steps (i), (ii) or (iii) with the proviso that said addition takes place before 50% of the total amount of silicate is added to the reaction medium.

In all the process embodiments outlined above and regardless of the stage of addition of the at least one alkali metal alkyl siliconate, the cumulative amount of said compound metered into the reaction medium is at least 0.5 wt %, typically at least 1.0 wt %, even at least 5.0 wt %. The total amount of the at least one alkali metal alkyl siliconate typically does not exceed 30.0 wt %, preferably it does not exceed 25.0 wt %. Suitable ranges are generally from 1.0 to 20.0 wt %, from 5.0 to 15.0 wt %, even from 5.0 to 12.0 wt %. The amount of methyl siliconate is calculated with respect to the silica concentration in the starting solution (calculated as the sum of the initial amount of silicate and the initial amount of alkaly metal alkyl siliconate).

The rate of addition of alkali metal alkyl siliconate can be adapted to obtain the desired content of alkyl moieties in the precipitated silica by means known to the person skilled in the art.

The reaction vessel in which the entire reaction of the silicate with the carboxylic acid is performed is usually equipped with adequate stirring and heating equipment.

The entire reaction of the silicate with the acid is generally performed at a temperature of between 40 and 96° C., in particular between 80 and 95° C. According to one variant of the invention, the entire reaction of the silicate with the acid is performed at a constant temperature, usually of between 40 and 96° C., in particular between 80 and 95° C.

According to another variant of the invention, the temperature at the end of the reaction is higher than the temperature at the start of the reaction: thus, the temperature at the start of the reaction is preferably maintained at between 40 and 80° C. and the temperature is then increased, preferably up to a value of between 80 and 96° C., at which value it is maintained up to the end of the reaction.

At the end of the steps that have just been described for each of the process embodiments, a suspension of precipitated silica is obtained, which is subsequently subjected to a separation step (liquid/solid separation). The process, in all of its embodiments, thus typically comprises a further step of filtering the suspension of precipitated silica and drying the precipitated silica. The process does not comprise any step wherein water is extracted from the precipitate using an organic solvent, e.g. an alcohol, or a supercritical fluid.

The separation usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The inventive precipitated silica can be used in a number of applications.

The inventive precipitated silica finds a particularly advantageous application as component in thermal insulation materials in view of its excellent thermal conductivity properties.

The inventive precipitated silica can also be used in the preparation of resorcinol-formaldehyde/silica composites, as absorbent or as additive in concrete or paper.

The inventive precipitated silica may also be used as reinforcing filler in plastic compositions. In particular, the inventive precipitated silica may be used as reinforcing filler in elastomeric compositions. As such the inventive silica provides improved mechanical properties to the elastomeric compositions, in view of its better ability to disperse in the elastomeric matrix. Suitable end-use applications for said elastomeric compositions are for instance tire components, such as tire treads. An object of the present invention are thus tires comprising the inventive silica.

The inventive silica may find further use as support for liquid components or as filtration agent, for instance in the filtration of beer.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXAMPLES

Analytical Methods

The physicochemical properties of the precipitated silica of the invention were determined using the methods described hereafter.

CTAB Surface Area

The CTAB surface area was determined according to standard NF ISO 5794-1, Appendix G (June 2010).

Determination of Total Carbon Content

The total carbon content was measured using a carbon/sulfur analyzer, such as Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 g of tungsten (in particular Lecocel 763-266), approximately 1 g of iron and approximatively 0.25 g of tin). The carbon present in the sample to be analyzed (weight of approximately 0.2 g) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement.

The result is expressed as percentage by weight of elemental carbon with respect to the weight of the silica sample.

$^{13}C$ NMR Spectroscopy

The product was characterized by 1D $^{13}C$ MAS NMR spectroscopy on a Bruker Avance solid 300 spectrometer working at 7.04 T. A commercial 4 mm high speed probe (DVT4) with a spinning frequency of 10 KHz was used in cross polarization with 90° pulse, a 3 msec contact time and a 5 sec recycling time and 10000-20000 transients. The area of the spectrum analysed for the identification of the methyl resonances was from −15 to 10 ppm.

Calibration was done with respect to adamantane, which is characterized by two chemical shift at 38.5 ppm and 29.4 ppm.

Determination of Pore Volume and Size of Pores by Mercury Porosimetry

Pore volume and pore size distribution were determined using a Micromeritics AutoPore® IV 9520 porosimeter; they were calculated by the Washburn relationship with a contact angle theta equal to 140° and a surface tension gamma equal to 485 dynes/cm. Each sample was dried before the measure in an oven at 200° C. for 2 hours at atmospheric pressure. The starting weight of silica placed in the type 10 Penetrometer, having an accuracy of 0.001 g, was selected for good reproducibility of the measurement, in such a way that the "stem volume used", i.e. the percentage mercury (Hg) volume consumed for filling of the penetrometer was from 40% to 80%. The penetrometer was then slowly evacuated to 50 µm of Hg and kept at this pressure for 5 min.

The AutoPore® equipment was operated using Software Version IV 1.09.

No corrections were performed on the raw data. The measurement range was from 3.59 kPa (0.52 psi) to 413685 kPa (60000 psi), and at least 100 measurement points were used (19 measurement points from 3.59 kPa (0.52 psi) to 193 kPa (28 psi) with 10 seconds of equilibrium time and then 81 points from 1.93 kPa (0.28 psi) to 413685 kPa (60000 psi) with a 20 seconds equilibrium time). If appropriate, the software introduced further measurement points if the incremental intrusion volume was >0.5 mL/g. The intrusion curve was smoothed by means of the "smooth differentials" function of the equipment software.

The Log Differential Intrusion (mL/g) versus pore size data was analysed in the pore diameter range from 3.5 nm to 5 µm.

Determination of the Thermal Conductivity by Hot-Wire Method

Sample Preparation

The sample was milled using a ceramic mortar and sieved manually using two meshes: one of grid of 25 µm and the other of 250 µm. Then, about 10 g of sample with granulometry between 25 µm and 250 µm were put into a glass flask of ca. 35 mL. The flask was tapped several times in order to tightly pack the silica bed. The weight of the sample, of the flask and of a plastic cap are recorded, as well as the volume occupied by the packed silica bed.

The sample-containing flask (without cap) was put in an oven at 110° C. and left overnight. The next day, the sample was put in a desiccator for 30 min for allowing it to cool down. Once cooled, the flask was closed with the plastic cap and the total weight of the assembly was recorded. This allows calculating the amount of water removed overnight.

Measurement

The thermal conductivity measurements were performed using a CT-metre (Teleph S.A., France) equipped with a Sequencer Multi Measures for CT-metre (Teleph S.A., France). Beforehand, a 0.05 m-length wire sensor (Teleph S.A., France) with a resistance of 7.51 Ω was installed within a vacuum oven Vacucell (Fisher Bioblock Scientific, France) and plugged onto the Sequencer. The measurements were carried out within the vacuum oven at 31±2° C. and at pressures varying from $9 \times 10^{-5}$ to 1 bar.

A 40 mL-beaker with 20 mL of dried silica was introduced and kept inside the oven to reduce the humidity. A purge of the incoming air was forced to pass through a dry silica bed in order to decrease the moisture in the air inlet line. A 0.5 bar vacuum was set in the oven. Then, dried air was introduced to return to atmospheric pressure. Subsequently, the sample-containing flask was introduced in the oven and the wire sensor was placed in the middle of the sample. The flask was tapped a few times to help settle the silica bed around the sensor.

Once the temperature was stable at 31±2° C., the measurement was carried out using 0.125 W of power for 60 seconds and recording the temperature increase every second.

For the measurements under vacuum (0.1 bar), a similar procedure was used, except that after pressure and temperature stabilisation, the measurement was carried out using 0.070 W of power for 80 seconds and recording the temperature increase every second. This modification is to avoid sample overheating beyond 60° C. that would deteriorate the sensor.

Data Treatment

The thermal conductivity is calculated using the equation:

$$\lambda = \frac{P}{4\pi L \alpha}$$

where λ is the thermal conductivity in W/m·K, P is the power delivered by the wire in W, L is the wire length in m and α is the slope of the curve:

$$\Delta T(t) = \alpha \ln(t) + \beta$$

where ΔT is the increase of temperature as a function of time. In order to have a linear fit, only the data recorded for temperature increases between 8 and 15° C. are considered.

The uncertainty of the measurement is taken as 5%, as recommended by the instrument manufacturer.

EXAMPLES

Example 1

In a 25 L stainless steel reactor were introduced: 6.98 L of purified water, 149.5 g of $Na_2SO_4$ (solid), 5.59 kg of a sodium silicate solution ($SiO_2/Na_2O$ ratio=3.43; $SiO_2$ concentration=19.4 wt %, used in all the steps of the process) and 471 g of potassium methylsiliconate solution (SILRES® BS 16, Wacker Chemie AG; $SiO_2$ concentration: 10 wt %).

The obtained solution was stirred and heated to reach 80° C. A 10.1 wt % glutaric acid solution at a flowrate of 110 g/min was then introduced in the reactor over a period of 20 min. After this first step, a 10.1 wt % glutaric acid solution was added at a flowrate of 110 g/min until the reaction medium reached the pH value of 8.0. The temperature of the medium was 80° C. for the first 20 min of the addition of glutaric acid solution. The reaction medium was then heated to 92° C. in approximatively 7 min. The rest of the precipitation reaction was carried out at this temperature.

Simultaneously, over a period of 20 min, were introduced: sodium silicate, at a flowrate of 57.8 g/min, and a 10.1 wt % glutaric acid solution. The flowrate of the 10.1 wt % glutaric acid solution was regulated so that the pH of the reaction medium was maintained at a value of 8.0.

At the end of the simultaneous addition, the pH of the reaction medium was brought to a value of 5.5 with 10.1 wt % glutaric acid solution at a flowrate of 72.5 g/min. The reaction mixture was allowed to stand for 5 minutes. A suspension of precipitated silica was obtained.

The suspension was filtered and washed on a filter plate. The filter cake obtained was disintegrated mechanically and water was added to obtain a $SiO_2$ suspension at 15% of silica S1.

The resonance the chemically bound methyl groups in the $^{13}C$ NMR spectrum of silica S1 is at −3.6 ppm. The packing density of silica S1 is 0.17 g/cm³.

The remaining properties of silica S1 are reported in Table 1.

Example 2

In a 1 L stainless steel reactor were introduced: 279 g of purified water, 5.98 g of $Na_2SO_4$ (solid), 222 g of a sodium silicate solution ($SiO_2/Na_2O$ ratio=3.38; $SiO_2$ concentration=19.3 wt %, used during the whole process), 18.65 g of potassium methylsiliconate solution (SILRES® BS 16, Wacker Chemie AG; $SiO_2$ concentration: 10 wt %).

The obtained solution was stirred and heated to reach 81° C. A 8.1 wt % malonic acid solution at a flowrate of 4.4 g/min was then introduced in the reactor over a period of 20 min. After this first step, a 8.1 wt % malonic acid solution was added at a flowrate of 4.45 g/min until the reaction medium reached the pH value of 8.0. The temperature of the medium was 80° C. for the first 20 min of the addition of malonic acid solution. The reaction medium was then heated to 92° C. in approximatively 7 min. The rest of the precipitation reaction was carried out at this temperature.

Simultaneously, over a period of 20 min, were introduced: sodium silicate, at a flowrate of 2.3 g/min, and a 8.1 wt % malonic acid solution. The flowrate of the 8.1 wt % malonic acid solution was regulated so that the pH of the reaction medium was maintained at a value of 8.0.

At the end of the simultaneous addition, the pH of the reaction medium was brought to a value of 5.5 with 8.1 wt % malonic acid solution at a flowrate of 2.6 g/min. The reaction mixture was allowed to stand for 5 minutes. A suspension of precipitated silica was obtained. The suspension was filtered and washed on a filter plate. The filter cake obtained was disintegrated mechanically and water was added to obtain a $SiO_2$ suspension at 15% of silica S2.

The resonance the chemically bound methyl groups in the $^{13}C$ NMR spectrum of silica S2 is at −4.0 ppm. The packing density of silica S2 is 0.28 g/cm³.

The remaining properties of silica S2 are reported in Table 1.

Example 3

In a 1 L stainless steel reactor were introduced: 279 g of purified water, 5.98 g of $Na_2SO_4$ (solid), 222 g of a sodium silicate solution ($SiO_2/Na_2O$ ratio=3.38; $SiO_2$ concentration=19.3 wt %, used during the whole process), 18.65 g of potassium methylsiliconate solution (SILRES® BS 16, Wacker Chemie AG; $SiO_2$ concentration: 10 wt %).

The obtained solution was stirred and heated to reach 81° C. A 9.1 wt % succinic acid solution at a flowrate of 4.4 g/min was then introduced in the reactor over a period of 20 min. After this first step, 9.1 wt % succinic acid solution was added at a flowrate of 4.45 g/min until the reaction medium reached the pH value of 8.0. The temperature of the medium was 80° C. for the first 20 min of the addition of succinic acid solution. The reaction medium was then heated to 92° C. in approximatively 7 min. The rest of the precipitation reaction was carried out at this temperature.

Simultaneously, over a period of 20 min, were introduced: sodium silicate, at a flowrate of 2.3 g/min, and a 9.1 wt % succinic acid solution. The flowrate of the 9.1 wt % succinic acid solution was regulated so that the pH of the reaction medium was maintained at a value of 8.0.

At the end of the simultaneous addition, the pH of the reaction medium was brought to a value of 5.5 with 9.1 wt % succinic acid solution at a flowrate of 2.6 g/min. The reaction mixture was allowed to stand for 5 minutes. A suspension of precipitated silica was obtained.

The suspension was filtered and washed on a filter plan. The filter cake obtained was disintegrated mechanically and water was added to obtain a $SiO_2$ suspension at 15% of silica S3.

The resonance the chemically bound methyl groups in the $^{13}C$ NMR spectrum of silica S3 is at −3.7 ppm. The packing density of silica S3 is 0.22 g/cm³.

The remaining properties of silica S2 are reported in Table 1.

Comparative Example 1

In a 25 L stainless steel reactor were introduced: 6.98 L of purified water, 149.5 g of $Na_2SO_4$ (solid), 5.59 kg of a sodium silicate solution ($SiO_2/Na_2O$ ratio=3.43; $SiO_2$ concentration=19.4 wt %, used in all the steps of the process) and 471 g of potassium methylsiliconate solution (SILRES® BS 16, Wacker Chemie AG; $SiO_2$ concentration: 10 wt %).

The obtained solution was stirred and heated to reach 80° C. A 7.7 wt % sulfuric acid solution at a flowrate of 110 g/min was then introduced in the reactor over a period of 20 min. After this first step, a 7.7 wt % sulfuric acid solution was added at a flowrate of 110 g/min until the reaction medium reached the pH value of 8.0. The temperature of the medium was 80° C. for the first 20 min of the addition of sulfuric acid solution. The reaction medium was then heated to 92° C. in approximatively 7 min. The rest of the precipitation reaction was carried out at this temperature.

Simultaneously, over a period of 20 min, were introduced: sodium silicate, at a flowrate of 57.8 g/min, and a 7.7 wt % sulfuric acid solution. The flowrate of the 7.7 wt % sulfuric acid solution was regulated so that the pH of the reaction medium was maintained at a value of 8.0.

At the end of the simultaneous addition, the pH of the reaction medium was brought to a value of 5.5 with 7.7 wt % sulfuric acid solution at a flowrate of 72.5 g/min. The reaction mixture was allowed to stand for 5 minutes. A suspension of precipitated silica was obtained.

The suspension was filtered and washed on a filter plate. The filter cake obtained was disintegrated mechanically and water was added to obtain a $SiO_2$ suspension at 15% of silica CS1.

The resonance the chemically bound methyl groups in the $^{13}C$ NMR spectrum of silica CS1 is at −3.7 ppm. The packing density of silica CS1 is 0.32 g/cm³.

The remaining properties of silica CS1 are reported in Table 1.

TABLE 1

| Silica | CTAB (m²/g) | $V_{100}$ (mL/g) | Carbon content (wt %) | Thermal conductivity @ 1 bar (mW/m · K) | Thermal conductivity @ 0.1 bar (mW/m · K) |
|---|---|---|---|---|---|
| S1 | 220 | 1.36 | 1.7 | 36.5 | 0.2 |
| S2 | 245 | 1.24 | 1.6 | 45.0 | 0.2 |
| S3 | 230 | 1.37 | 1.7 | 39.4 | 0.2 |
| CS1 | 265 | 1.13 | 1.6 | 53.0 | — |

As it can be seen from the data in Table 1, the inventive silicas S1-S3 have a significantly lower thermal conductivity than silica CS1 and a higher value of $V_{100}$.

The invention claimed is:

1. A precipitated silica characterised by:
   a CTAB surface area in a range of from 170 to 600 $m^2/g$;
   a volume of pores having a diameter of 100 nm or less in a range of from 1.15 to 2.50 mL/g;
   a carbon content in a range of from 0.5 wt % to 15.0 wt % with respect to a total weight of the precipitated silica;
   a thermal conductivity λ, measured at 1 bar, of no more than 50 mW/m·K;
   and a thermal conductivity λ measured under vacuum of at most 1 mW/m·K.

2. The precipitated silica according to claim 1 which comprises linear or branched alkyl moieties of formula $(C_mH_{2m+1})$— chemically bound to Si atoms, wherein m is an integer from 1 to 5, wherein said alkyl moieties comprise methyl groups and wherein a resonance assigned to said methyl groups in said alkyl moieties in a $^{13}C$ NMR spectrum of the precipitated silica is between −2.5 and −4.5 ppm.

3. The precipitated silica of claim 2 wherein said alkyl moieties are methyl groups.

4. The precipitated silica of claim 1 characterized by a CTAB surface area in a range of 180 to 600 $m^2/g$.

5. The precipitated silica of claim 1 characterized by a packing density of between 0.10 and 0.35 $g/cm^3$.

6. A process for preparing the precipitated silica of claim 1 which comprises the reaction of a silicate with a carboxylic acid to produce a suspension of precipitated silica, said reaction comprising at least one step wherein at least one alkali metal alkyl siliconate is provided to the reaction medium before 50% of the precipitation reaction has taken place.

7. The process according to claim 6 which comprises the steps of:
   (i) providing a starting solution comprising at least a portion of the total amount of the alkali metal alkyl siliconate, at least a portion of the total amount of the silicate involved in the reaction and optionally an electrolyte, the concentration of silicate in the starting solution being less than 100 g/L;
   (ii) adding an amount of a carboxylic acid to said starting solution to obtain a pH value for the reaction medium of at least 7.0; and
   (iii) further adding a carboxylic acid and, if appropriate, simultaneously the remaining portion of silicate to the reaction medium to obtain a silica suspension
   wherein the remaining portion of the at least one alkali metal alkyl siliconate, if any, is metered into the reaction medium in at least one of steps (ii) or (iii).

8. The process according to claim 6 which comprises the steps of:
   (i) providing a starting solution comprising part of the total amount of silicate engaged in the reaction, the concentration of silicate in said starting solution being less than 20 g/L;
   (ii) adding carboxylic acid to said starting solution, until at least 50% of the amount of silicate present in said starting solution is neutralized;
   (iii) simultaneously adding silicate and carboxylic acid to the reaction medium, such that the ratio (amount of silicate added)/(amount of silicate present in the starting solution) is greater than 4 and not more than 100; and
   (iv) stopping the addition of the silicate while continuing the addition of the carboxylic acid to the reaction medium, until a value of the pH of the reaction medium of between 2.5 and 5.3 is reached and a suspension of precipitated silica is obtained,
   wherein the at least one alkali metal alkyl siliconate is metered into the reaction medium in at least one of steps (i), (ii) or (iii).

9. The process of claim 6 wherein the at least one alkali metal alkyl siliconate is sodium or potassium methyl siliconate.

10. The process of claim 6 wherein the carboxylic acid is selected from the group consisting of the linear or branched, saturated or unsaturated, aliphatic carboxylic acids having from 1 to 20 carbon atoms and from the aromatic carboxylic acids.

11. The process of claim 10 wherein the carboxylic acid is selected from the group consisting of the linear or branched, saturated or unsaturated, aliphatic carboxylic acids having from 2 to 8 carbon atoms.

12. The process of claim 6 wherein the alkali metal alkyl siliconate is selected from those of general formula (I):

HO—[$(C_mH_{2m+1})$Si(OM)-O—]$_n$H (I)

wherein n is an integer from 1 to 6; $(C_mH_{2m+1})$— is linear or branched alkyl radical
wherein m is an integer from 1 to 5; and M is an alkali metal.

13. An article comprising the precipitated silica of claim 1.

14. The article of claim 13 which is a thermal insulation material, a resorcinol-formaldehyde/silica composite, concrete, paper, a tire or tire component.

15. The precipitated silica of claim 1 characterized by a CTAB surface area in a range of 205 to 600 $m^2/g$.

16. The precipitated silica of claim 1 characterised by a carbon content in a range of from 1.4 to 2.2 wt %.

17. The precipitated silica of claim 4 characterised by a carbon content in a range of from 1.4 to 2.2 wt %.

18. The precipitated silica of claim 15 characterised by a carbon content in a range of from 1.4 to 2.2 wt %.

* * * * *